United States Patent
Zhou et al.

(10) Patent No.: US 9,041,689 B1
(45) Date of Patent: May 26, 2015

(54) ESTIMATING FINGERTIP POSITION USING IMAGE ANALYSIS

(75) Inventors: Dong Zhou, San Jose, CA (US); Isaac S. Noble, Soquel, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 197 days.

(21) Appl. No.: 13/565,019

(22) Filed: Aug. 2, 2012

(51) Int. Cl.
*G06F 3/042* (2006.01)
*G06F 3/041* (2006.01)
*G06K 9/46* (2006.01)
*G06K 9/66* (2006.01)
*G06F 3/033* (2013.01)
*G06F 3/0488* (2013.01)

(52) U.S. Cl.
CPC ............ *G06F 3/0425* (2013.01); *G06F 3/0488* (2013.01)

(58) Field of Classification Search
USPC ................... 345/173–178; 178/18.01–20.04; 715/863
See application file for complete search history.

(56) References Cited

U.S. PATENT DOCUMENTS

| | | | |
|---|---|---|---|
| 2008/0163131 A1* | 7/2008 | Hirai et al. | 715/863 |
| 2010/0194713 A1* | 8/2010 | Kawashima et al. | 345/175 |
| 2011/0142353 A1* | 6/2011 | Hoshino et al. | 382/203 |
| 2012/0230555 A1* | 9/2012 | Miura et al. | 382/124 |
| 2013/0135260 A1* | 5/2013 | Damhaug et al. | 345/175 |
| 2013/0236089 A1* | 9/2013 | Litvak et al. | 382/154 |
| 2013/0336528 A1* | 12/2013 | Itani et al. | 382/103 |

* cited by examiner

*Primary Examiner* — Ryan A Lubit
(74) *Attorney, Agent, or Firm* — Novak Druce Connolly Bove + Quigg LLP

(57) ABSTRACT

A computing device and/or application executing on the device can utilize fingertip tracking using a camera. However, when the fingertip is in a dead zone (an area that is not viewable by the camera), the fingertip tracking cannot function properly. Nevertheless, the position of the fingertip, when in the dead zone, can still be estimated. An image of a user's hand can be captured by at least one camera. A portion of a pointing finger can be detected in the captured image. An orientation of the portion of the pointing finger can be determined. One or more joint lines of the pointing finger can be identified. Based on data about a slant and/or a bend of the pointing finger obtained using information relating to the identified joint line(s), and/or on data obtained via calibration and/or historic/current usage, the position of the fingertip, when in the dead zone, can be approximated.

25 Claims, 8 Drawing Sheets

ESTIMATING FINGERTIP POSITION USING IMAGE ANALYSIS

BACKGROUND

Computing devices are being used for a variety of tasks. Sometimes, a computing device or an application running on the computing device can detect and track a user's fingertip position. For example, a game application can track the position of the user's fingertip as he/she moves his/her finger. The movements of the fingertip tracked by the game can cause the game to provide responses accordingly. In another example, a computing device can track the position of the user's fingertip such that the fingertip can function as a pointer tool. When the user moves his/her fingertip, a cursor can move correspondingly on the screen of the computing device. However, conventional approaches generally detect and track the user's fingertip using a camera. If the user moves his/her fingertip out of the area viewable by the camera, then the fingertip position detection and tracking can function improperly, which will take away from the general user experience.

BRIEF DESCRIPTION OF THE DRAWINGS

Various embodiments in accordance with the present disclosure will be described with reference to the drawings, in which.

DETAILED DESCRIPTION

Figure 1:
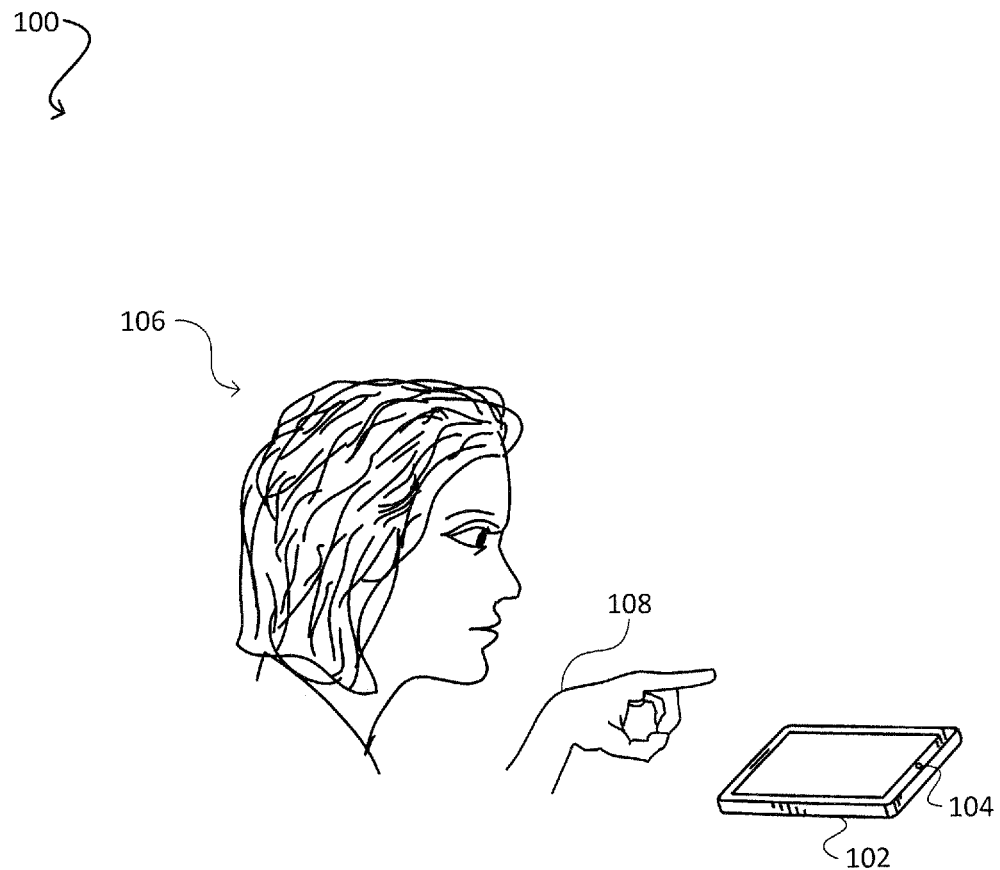
FIG. 1 illustrates an example environment in which aspects of the various embodiments can be utilized.

Systems and methods in accordance with various embodiments of the present disclosure overcome one or more of the above-referenced and other deficiencies in conventional approaches to estimating fingertip position. In particular, various embodiments can estimate fingertip position using image analysis. At least one camera can capture an image (e.g., still image, video image, etc.) representing a hand of a user of a computing device, including a portion of a pointing finger of the user's hand. For example, the at least one camera can capture an image representing a palmar side of the user's hand formed in a pointing hand position. However, the fingertip of the pointing finger may be in a "dead zone," an area that is not viewable by the at least one camera. Nevertheless, the present disclosure can still attempt to estimate/approximate a position of the fingertip.

In some embodiments, the portion of the pointing finger can be recognized/detected/determined from the hand in the captured image. The portion of the pointing finger can be detected using, for example, image processing based on convexity defects, skeletonization, and/or template matching. Upon detecting the portion of the pointing finger, an orientation of (the portion of) the pointing finger can be determined. For example, the orientation can correspond to the general direction at which the pointing finger is pointing.

In some embodiments, one or more joint lines of the pointing finger can be identified. In some embodiments, the captured image can be an IR image captured by at least one IR camera. In IR images, joint lines can appear darker than other parts of the finger. As such, the one or more joint lines can be identified, for example, as being associated with the darker regions of the palmar side of the pointing finger, wherein the darker regions correspond to one or more linear features within an allowable deviation from being orthogonal to the determined orientation (because joint lines are generally orthogonal to the central axis of a finger). In some embodiments, the captured image can be an image captured by at least one panchromatic camera. In panchromatic images, joint lines can also appear darker than other parts of the finger. For example, in Hue Saturation Lightness (HSL) color space, joint lines can have lower lightness than other parts of the finger.

In some embodiments, the one or more identified joint line can be utilized (at least in part) to calculate a slant amount and a bend amount of (one or more finger segments of) the pointing finger. For example, the calculation of the slant amount can utilize at least one of a brightness level of an area associated with the identified joint lines or a separation of distance between the identified joint lines. The calculation of the bend amount can be, for example, based at least in part upon evaluating one or more contrasts in brightness between the identified joint lines and at least one of the first or the second finger segment. The calculated slant amount can indicate in which direction (toward/away from the computing device) and to what degree the pointing finger slants (if at all); the greater the slant toward the device, the closer the fingertip will be to the device, and vice versa. The calculated bend amount can indicate the degree of bending by the pointing finger (if at all); the greater the bend, the closer the fingertip will be to the device, and vice versa. As such, the slant and bend amounts calculated using the identified joint line(s) can be useful in approximating a position of the fingertip of the pointing finger.

FIG. 1 illustrates an example environment in which aspects of the various embodiments can be utilized. The example environment 100 can comprise a computing device 102 and at least one camera 104. A user 106 of the computing device 102 can use his/her hand 108 to operate the computing device 102, for example, by tapping on a touchscreen of the computing device 102 to submit input. In some embodiments, the user 106 can operate the computing device 102 and an application running on the computing device 102 using gestures, motions, etc. For example, an application executing on the computing device 102 can attempt to track the position of the user's hand 108 as the user 106 moves his/her hand 108, such that a particular movement of the user's hand 108 can trigger a particular response from the computing device 102 and/or application. In some embodiments, the fingertip position of the user's pointing finger can be tracked and used to operating the computing device and/or application. In other words, gestures, movements, motions, etc. of the user's fingertip can be tracked and used to operate the computing device/application.

Figure 2A:
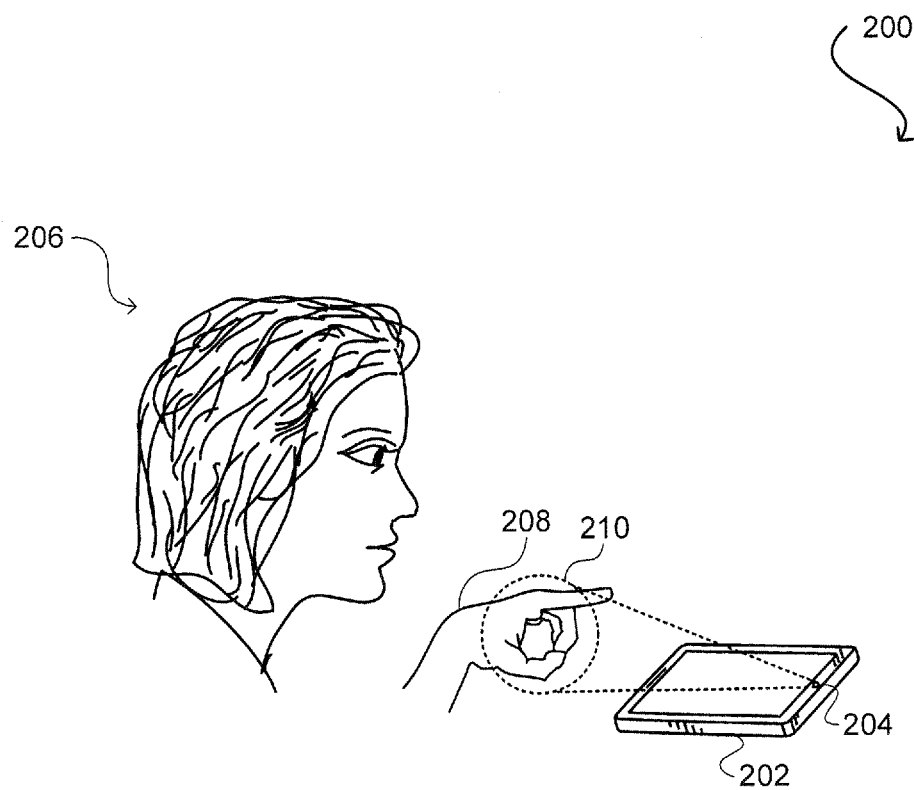
FIG. 2A illustrates an example system embodiment for estimating fingertip position using image analysis.

FIG. 2A illustrates an example system embodiment 200 for estimating fingertip position using image analysis. The example system embodiment can include a computing device 202 and at least one camera 204. In some embodiments, the at least one camera 104 can be at least one infrared (IR) camera. Infrared cameras can be used to record and/or emphasize brightness and contrast in captured images, which can be useful in gauging, measuring, and/or approximating distance, dimensions, depth, detecting edges, etc. It is also contemplated that, in some embodiments, the at least one camera 104 can include at least one panchromatic camera.

A user 206 of the computing device 202 can move his/her hand 208 into an area 210 that is viewable by the at least one camera 204. As such, if the computing device 202 and/or an application running on the device 202 uses motion and/or gesture detection/tracking, the device 202 and/or application can utilize the at least one camera 204 to detect/track the hand 208 in the area 210 viewable by the at least one camera 204.

For example, a game application can use the camera 204 to track a fingertip on a hand 208 of a user 206. As the user 206 moves his/her fingertip, the game can detect and/or track the movements of the fingertip and provide the appropriate response. However, if the user 206 moves his/her fingertip into a "dead zone," an area that is not viewable by the at least one camera 204, then the fingertip cannot be detected/tracked and thus the game cannot function properly. The present disclosure allows for estimating a position of a fingertip of a hand using image analysis such that the approximate position of the fingertip can be determined even when the fingertip is in a dead zone.

Figure 2B:
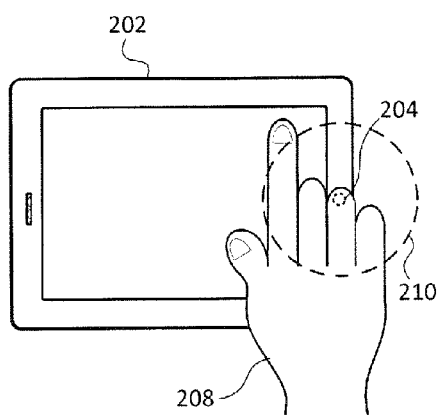
FIG. 2B illustrates an example top view of the example system embodiment of FIG. 2A.

FIG. 2B illustrates an example top view of the example system embodiment of FIG. 2A. In FIG. 2B, the top view shows the computing device 202 and the user's hand 208. From the top view, the at least one camera 204 can be block from view by the (dorsal side) hand 208, as shown in FIG. 2B. In some embodiments, the at least one camera 204 can be a front facing camera such that it can capture images (including video) of the view in front of the device 202. As the user 206 moves his/her hand 208 toward the device 202 (and thus toward the camera 204), at least a portion of the user's hand 208 can become within the area 210 viewable (i.e., viewing area, viewable area) by the at least one camera 204. However, the fingertip of the pointing finger (i.e., pointing fingertip) of the user 208 can be in a dead zone, such that the pointing fingertip is outside the viewing area 210 of the at least one camera 204.

Figure 2C:
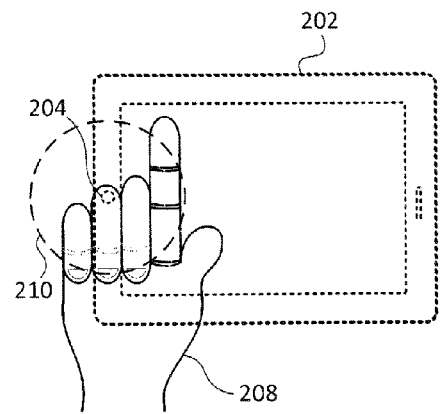
FIG. 2C illustrates an example bottom view of the example system embodiment of FIG. 2A.

FIG. 2C illustrates an example bottom view of the example system embodiment of FIG. 2A. The bottom view shows the computing device 202 and the user's hand 208, and can provide an example perspective of what the camera 204 views. As illustrated in FIG. 2C, the example bottom view (as well as the view of the at least one camera 204) contains the palmar side of the user's hand 208. In particular, the viewing area 210 of the camera 204 includes a portion of the hand 208 forming a pointing gesture, with a pointing finger outstretched. From FIG. 2C, it is clear that the fingertip of the pointing finger is outside the viewable area 210, being just beyond the upper edge of the viewing area 210.

Nevertheless, the example system embodiment 200 can approximate and/or estimate the position of the fingertip of the pointing finger even when the fingertip is outside the viewable area 210. In some embodiments, the example system embodiment 200 can capture one or more images of the user's hand 208 in the viewable area 210. From the one or more images of the hand 208 in viewable area 210, a portion of a pointing finger (if any) can be detected, for example, by using image processing.

In some embodiments, an image processing approach based on convexity defects, skeletonization, and/or template matching can be used to detect the portion of the pointing finger (in the viewable area 210). In some embodiments, an orientation of the pointing finger and position of the fingertip in the previous camera image frame can be tracked and used in a directional scan either from the top, bottom, left, and/or right edges of the viewable area 210 to detect the tip of the pointing finger. With reference to FIGS. 2A, 2B, and 2C, the portion of the pointing finger can be detected as the first object encountered from a top directional scan.

Figure 3A:
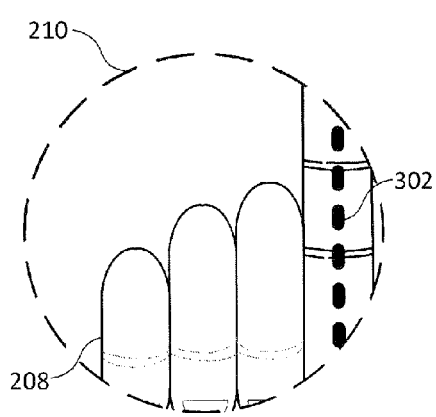
FIG. 3A illustrates an example area viewable by a camera used in estimating fingertip position using image analysis.

FIG. 3A illustrates an example area viewable by a camera used in estimating fingertip position using image analysis. FIG. 3A illustrates an enlarged viewable area 210 from the example of FIG. 2C. To reiterate, the viewing area 210 includes a portion of a user's hand 208 more specifically, the palmar side of the hand 208 in a pointing position; in the viewing area 210, three fingers (middle, ring, and index fingers) are curled against the palm of the hand 208 while one finger (i.e., the pointing finger) is outstretched. As shown in FIG. 3A, a portion of the pointing finger is included in the viewable area 210, but the fingertip is not.

With reference now to FIGS. 2A, 2B, and 2C and FIG. 3A, the system embodiment 200 can determine an orientation 302 of the portion of the pointing finger. The orientation 302 can be a general direction of the portion of the pointing finger. The orientation 302 of the pointing finger can be determined, for example, based upon defining a general directional vector/line for the detected portion of the pointing finger. In the example of FIG. 3A, the orientation 302 of the pointing finger is straight up vertically (or straight forward horizontally from the example top view of FIG. 2B).

Figure 3B:
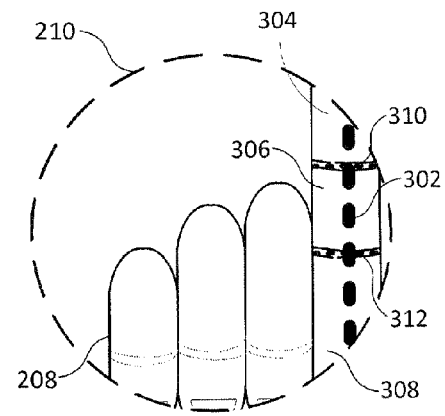
FIG. 3B illustrates an example area viewable by a camera used in estimating fingertip position using image analysis.

Now referring also to FIG. 3B, the system embodiment 200 can identify one or more joint lines of the pointing finger. Fingers (excluding the thumb) on a user's hand 208 typically have three segments: a first segment 304 including the fingertip, a second segment 306 in the middle, and a third segment 308 connecting the former two segments with the palm of the hand. Joint lines on a finger separate the segments of the finger. Not counting the thumb, each finger typically has three joint lines, one between the first and second segments, another between the second and third segments, and a final one between the third segment and the palm of the hand.

In some embodiments, infrared (IR) imaging can be used to identify the one or more joint lines. For example, the at least one camera 204 can comprise at least one IR camera to capture one or more IR images of the portion of the hand 208 in the viewable area 210. The one or more captured IR images can allow for contrasting between bright and dark areas of the portion of the hand 208. A joint line may not reflect as much line as a finger segment and thus can appear darker than an adjacent finger segment in an IR image. As such, the example system embodiment 200 can detect dark areas relative to the brighter finger segments. The dark areas can correspond to one or more linear features (e.g., lines) that are orthogonal (e.g., perpendicular, substantially orthogonal, within an allowable deviation from being orthogonal, etc.) to the determined orientation 302 of the finger. As such, the one or more joint lines can be identified based upon the one or more lines (e.g., 310, 312) orthogonal to the determined orientation 302. as shown in FIG. 3B.

Based on the one or more identified joint lines in the viewable area 210, the example system 200 can calculate a slant amount for the portion of the pointing finger to determine how close the pointing fingertip is to the device 202 (and/or camera 204). In some embodiments, a slant amount can represent an angle of slant of the portion of the pointing finger relative to an axis of the pointing finger when in a straight vertical position. In some embodiments, a slant amount can be denoted as a numerical degree or radian. In some embodiments, a slant amount can be denoted by a position format, such as "position 1", "position 2," "position 3," etc., wherein each of the positions can correspond to a respective amount of slant. For example, if the portion of the pointing finger has a slant amount correlating to "position 2," it can mean that the portion of the pointing finger has a 45 degree slant toward the device, whereas a slant amount correlating to "position 3" can mean a 30 degree slant toward the device, and so forth. It is contemplated that there can be various other ways of denoting a slant amount. If the pointing finger has a slant toward the device, the pointing fingertip will likely be closer, whereas if the pointing finger slants away from the device, then the pointing fingertip will likely be farther away from the device 202 and/or camera 204.

In some embodiments, two or more joint lines (e.g., associated with 310 and 312) can be in the viewable area 210 and thus can be identified. With the two or more joint lines (e.g., first and second joint lines) identified, the slant amount can be calculated by connecting the midpoints of the two or more joint lines. The 3D coordinates of the midpoints can be inferred from their 2D coordinates in the captured image, the widths of the joint lines in the capture image(s), and/or the actual physical widths of the joint lines.

Figure 3C:
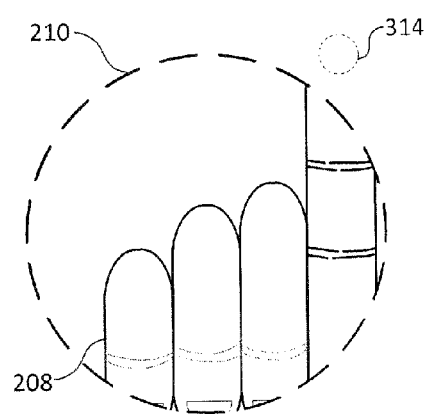
FIG. 3C illustrates an example area viewable by a camera used in estimating fingertip position using image analysis.
Figure 3D:
FIG. 3D illustrates an example area viewable by a camera and an example graph depicting image analysis.
Figure 3D:
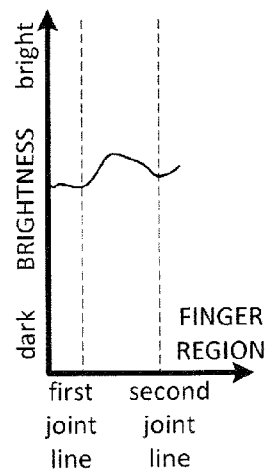
Figure 3E:
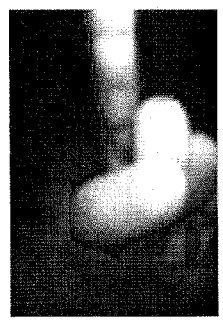
FIG. 3E illustrates an example area viewable by a camera and an example graph depicting image analysis.
Figure 3E:
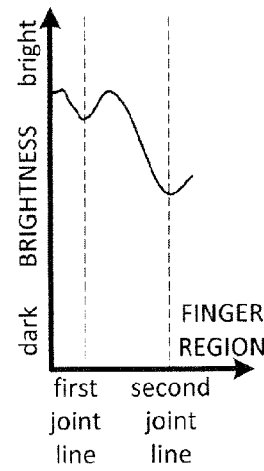

In some embodiments, only one joint line (e.g., the second joint line) is in the viewable area 210 and thus only that joint line can be identified. The system 200 can still utilize the joint line to calculate a slant amount. It should be noted that when the pointing finger is in a position with a negligible slant amount or a zero-value slant amount, as illustrated in the left portion of FIG. 3D, then the brightness levels for finger segments and joint lines are relatively similar and constant as represented in the graph in the right portion of FIG. 3D (i.e., the peaks and valleys are relatively small in magnitude). However, when there is a slant toward the device 202/camera 204, then starting with the identified joint line and moving toward the fingertip, the level of brightness increases. For example, as shown in FIG. 3E, moving up starting with the second joint line, the portions of the finger increase in brightness level, from which the system can calculate a slant amount indicating that the finger is slanting toward the device 202. The opposite can occur when the slant is away from the device 202 (e.g., the brightness level can decrease when moving up the finger starting with the second joint line). The calculation of the slant amount for one or more segments of the pointing finger can be utilized in estimating/approximating a position of the pointing fingertip.

Figure 3F:
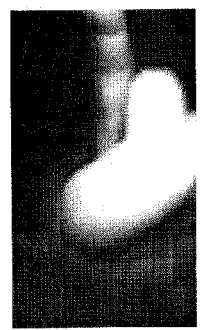
FIG. 3F illustrates an example area viewable by a camera and an example graph depicting image analysis.
Figure 3F:
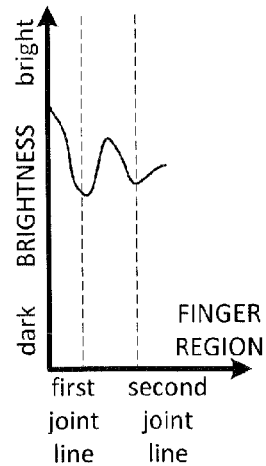

The one or more identified joint lines can also be utilized to calculate a bend amount for one or more segments of the pointing finger. As illustrated in the left portion of FIG. 3D, a pointing finger with a negligible or zero-value bend amount has relatively low contrast between its finger segments and joint lines; the graph in the right portion of FIG. 3D contains peaks and valleys with relatively small magnitudes, which indicates that the contrast between each finger segment and an adjacent joint line is relatively small. However, when the pointing finger is bent (toward the device/camera), then the contrast between each finger segment and an adjacent joint line increases, as illustrated in the left portion of FIG. 3F. In the right portion of FIG. 3F, the peaks and valleys of the graph are greater in magnitude, indicating greater contrast (e.g., wider differences in brightness) and greater bend. As such, based upon the one or more identified joint lines (e.g., the contrast levels between the finger segments and the joint lines), the system 200 can calculate a bend amount for one or more segments of the pointing finger.

In some embodiments, a bend amount can represent an angle of bend of one segment of the pointing finger relative to the next adjacent segment. For example, a bend amount of the second segment of the pointing finger can refer to an angle of bend of the second segment with respect to the third segment. Similarly, for example, a bend amount of the first segment of the pointing finger can be an angle of bend of the first segment with respect to the second segment. In some embodiments, a bend amount can be denoted as a numerical degree or radian. In some embodiments, a bend amount can be denoted by a position format, such as "position 1", "position 2," "position 3," etc., wherein each of the positions can correspond to a respective amount of bend. For example, if the second segment of the pointing finger has a bend amount correlating to "position 2," it can mean that the second segment of the pointing finger has a 45 degree bend relative to the third segment and toward the device, whereas a bend amount correlating to "position 3" can mean a 30 degree bend relative to the third segment and toward the device, and so forth. It is contemplated that there can be various other ways of denoting a bend amount.

Now turning back to FIG. 3C, an example area viewable by a camera used in estimating fingertip position using image analysis is illustrated. In FIG. 3C, the system 200 has utilized the identified one or more joint lines to approximate a position 314 of the pointing fingertip. The estimated position 314 of the pointing fingertip can be utilized by the computing device 202 and/or an application detecting/tracking the fingertip, especially when it moves into a dead zone.

Figure 4:
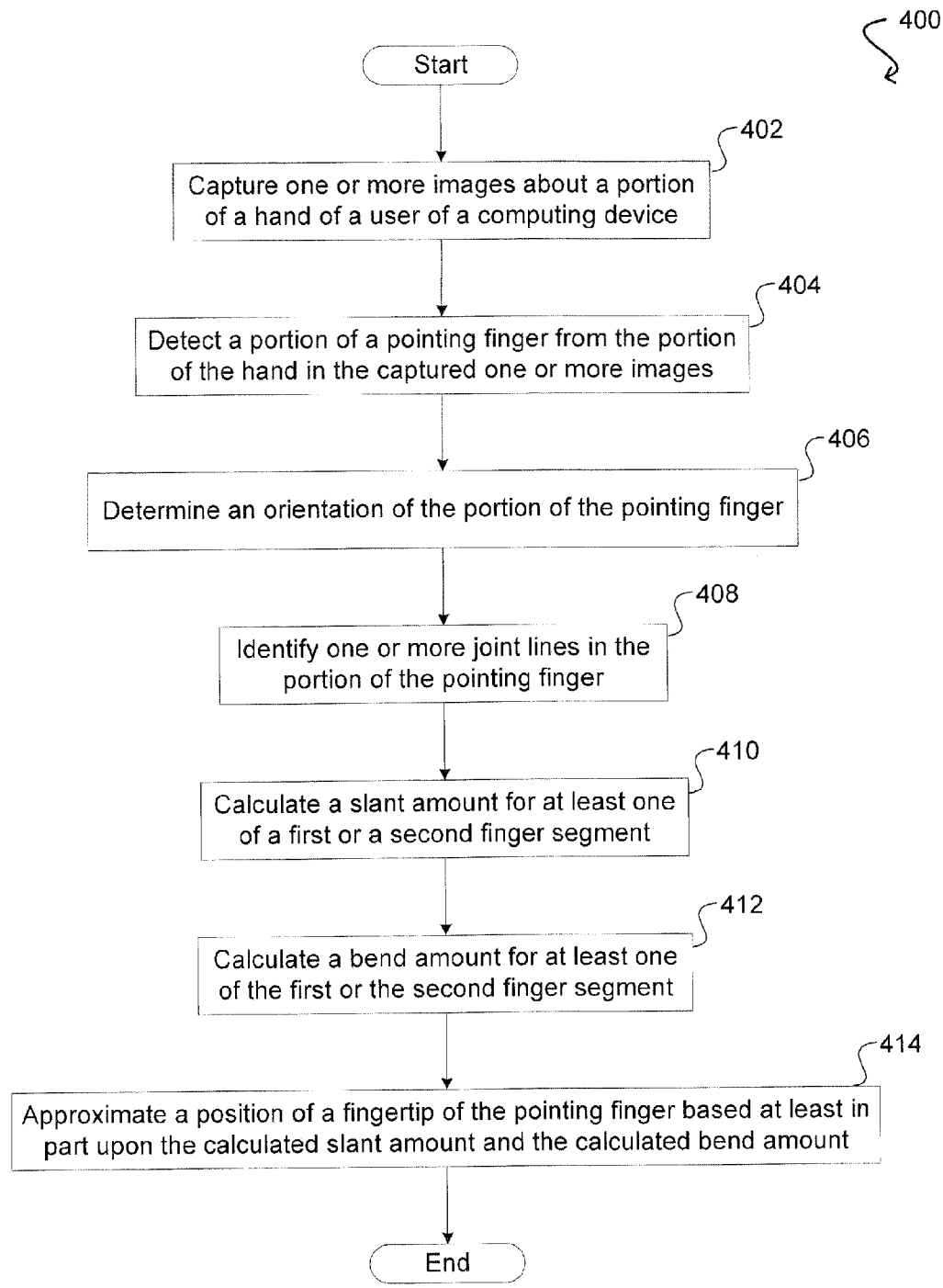
FIG. 4 illustrates an example method embodiment for estimating fingertip position using image analysis.

FIG. 4A illustrates an example method embodiment for estimating fingertip position using image analysis. It should be understood that there can be additional, fewer, or alternative steps performed in similar or alternative orders, or in parallel, within the scope of the various embodiments unless otherwise stated. The example method embodiment 400 can capture one or more images about at least a portion of a hand of a user of a computing device, at step 402. For example, in some embodiments, the example method embodiment 400 can use one or more IR cameras to capture one or more IR images about a palmar side portion of a user's hand. In some embodiments, the example method 400 can use one or more panchromatic cameras to capture one or more panchromatic images.

In some embodiments, image processing can be used to differentiate the pointing finger from the background (e.g., the pointing finger is brighter than the darker background); the bright region(s) of the pointing finger can be used to form the orientation. At step 404, the example method 400 can detect at least a portion of a pointing finger from the portion of the hand in the captured one or more images. For example, the method 400 can detect one or more finger segments of the pointing finger on the palmar side portion of the user's hand captured in the one or more images. In some embodiments, image processing based on convexity defects, skeletonization, and/or template matching can be used to detect the portion of the pointing finger. In some embodiments, a finger orientation tracking and directional scan approach can be used to detect the portion of the pointing finger, assuming that the pointing finger is the first finger encountered scanning from the top, bottom, left, or right (e.g., based upon known pointing finger information in a previously captured image) edge of the viewable area of the camera.

The method can determine an orientation of the portion of the pointing finger, at step 406. For example, the orientation of the portion can be determined by defining a general directional vector/line aligned with the detected portion of the pointing finger.

At step 408, the method 400 can identify one or more joint lines in the portion of the pointing finger. The identification of the one or more joint lines can be based at least in part upon detecting one or more lines in the captured one or more images that are orthogonal to the determined orientation of the portion of the pointing finger. For example, if the one or more images captured are IR images emphasizing brightness/contrast, then the method 400 can consider the brightness levels of various regions of the portion of the pointing finger. In some embodiments, the brighter regions can correspond to finger segments while the darker regions can correspond to joint lines. For example, if a dark region corresponds to a line orthogonal to the orientation of the pointing finger, then the method can identify a joint line as being associated with the dark region.

Based at least in upon utilizing the one or more identified joint lines, the method can calculate a slant amount for at least one of a first or a second finger segment, at step 410. The method can calculate an approximate slant amount for (one or more segments of) the pointing finger, for example, by taking into consideration various factors related to the one or more identified joint lines, such as the widths and/or orientations of the joint lines, the spacing/length between two or more joint lines, the brightness levels in the regions of or around the one or more joint lines, etc. In some embodiments, the slant amount can be negligible or zero-valued, as is the case when the pointing finger is minimally slanted or not slanted (e.g., parallel) with respect to the face of the computing device.

At step 412, the method can calculate a bend amount for at least one of the first or the second finger segment. The calculation of the bend amount can be based at least in part upon utilizing the identified one or more joint lines. For example, the calculation can be based upon one or more contrasts between the one or more identified joint lines and at least one of the first or the second finger segment. In other words, the example method 400 can consider the difference(s) in brightness levels between the one or more identified joint lines and the adjacent first and/or second finger segments; if the difference is great (e.g., a bright finger segment relative to a dark joint line), then it is likely that (one or more segments of) the pointing finger is bent. As such, the method can calculate a bend amount based at least in part upon utilizing the identified one or more joint lines. In some embodiments, the bend amount can be negligible or zero-valued, as is the case when the pointing finger is minimally bent or not bent (e.g., outstretched in a straight fashion).

At step 414, the example method embodiment 400 can utilize at least in part the calculated slant amount and the calculated bend amount to approximate a position of a fingertip of the pointing finger. For example, the calculated slant amount can indicate whether or not (one or more segments of) the pointing finger is slanted toward the device/camera, away from the device/camera, or not slanted (e.g., parallel to the face of the device, negligibly slanted). If the finger is slanted toward the device/camera, then the fingertip can be approximated to be closer to the device/camera, whereas if the slant is away from the device/camera, then the fingertip is likely to be further away. Similarly, the calculated bend amount can indicate whether or not (one or more segments of) the pointing finger is bent (e.g., toward the device/camera). If bent, then the fingertip can be approximated to be closer to the device/camera. Otherwise, the fingertip can be approximated to be further away. Utilizing at least in part the calculated slant amount and the calculated bend amount, the method 400 can provide a more accurate approximation for the position of the fingertip of the pointing finger. Therefore, even when the fingertip is in a dead zone, its (estimated) position can still be determined/tracked.

In some embodiments, the physical dimensions of the user's hand and/or pointing finger can already be known or (pre-) determined. For example, there can be a calibration process to determine and store various measurements of distance, depth, dimensions (e.g., length, width, thickness, circumference, etc.), shape, orientation, and other characteristic data for the user's hand (e.g., fingers, joint lines, segments. etc.). In some embodiments, the various measurements can be determined by utilizing a stereo or 3D camera. The characteristic data can be measured with respect to the view of the device or with respect to actual, physical space. The calibration process can also obtain characteristic data about the device (e.g., length, width, depth/thickness, distance from a point on a screen to a camera, etc.). In some embodiments, the calibration process can occur internally/implicitly while the camera can view the user's hand. In some embodiments, historical data can be collected and/or prior models can be formed for the characteristics/attributes of user's hand with respect to the device.

In some embodiments, as mentioned previously, the at least one camera can include at least one panchromatic camera. Panchromatic images can be used as well in accordance with the various embodiments of the present disclosure. For example, the panchromatic images captured can still show contrast(s) between bright and dark areas and/or the panchromatic images can be converted to grayscale.

Furthermore, various embodiments consistent with the present disclosure can be implemented for a user wearing a glove. Assuming that the glove absorbs and reflects light in a similar fashion to the user's hand without the glove, it is contemplated that the various embodiments presently disclosed can be implemented for the user's hand in a glove.

Figure 5:
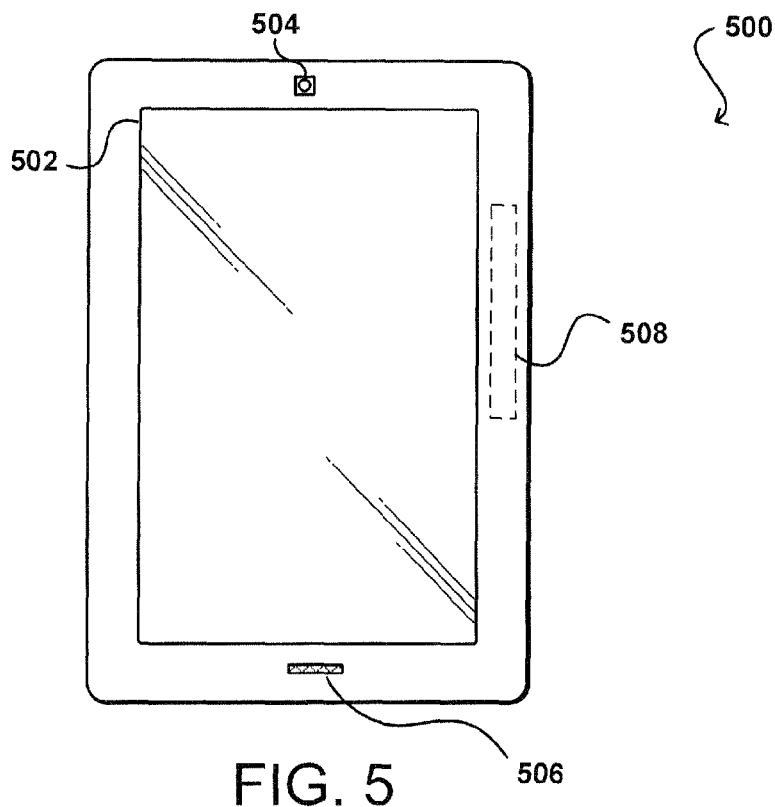
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 500 also includes at least one orientation sensor 508, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 6:
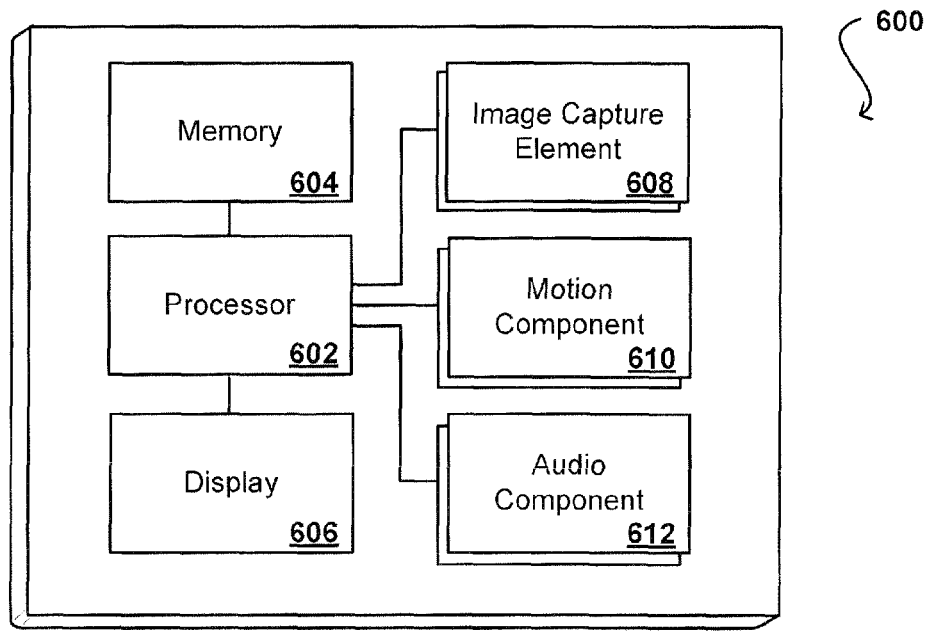
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one image capture element 608 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 612, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor 610. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As an example, a computing device such as that described with respect to FIG. 5 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 7:
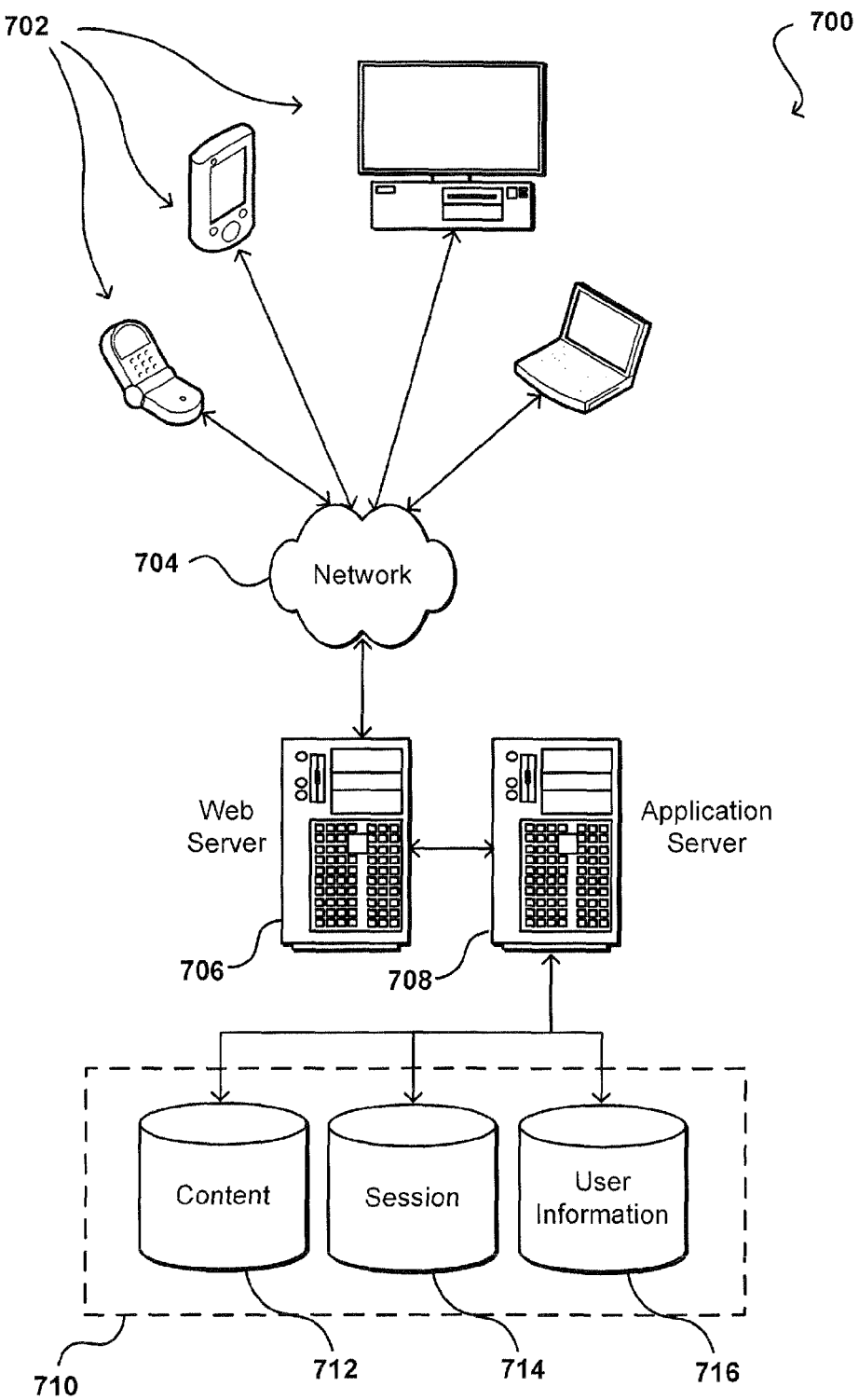
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like.

The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 702. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   capturing, using a camera of a computing device, an image representing a hand of a user of the computing device;
   retrieving, from a database, historical characteristic data for the hand of the user while the hand of the user is in a field of view of the camera, the historical characteristic data including (i) historical characteristic device data relating to physical dimensions of the computing device, and (ii) historical characteristic user data relating to physical dimensions of a pointing finger of the hand of the user;
   determining a portion of the pointing finger of the hand in the captured image based at least in part on the historical characteristic data;
   determining an orientation of the portion of the pointing finger;
   detecting one or more linear features in the portion of the pointing finger that are less than a threshold amount of deviation from being orthogonal to the determined orientation of the portion of the pointing finger;
   identifying one or more joint lines in the portion of the pointing finger based at least in part upon the one or more detected linear features;
   calculating a slant amount for at least one of a first finger segment or a second finger segment, wherein the calculation of the slant amount utilizes at least one of a brightness contrast between at least two palmar side areas on the portion of the pointing finger or a measurement of distance between midpoints of at least two identified joint lines;
   calculating a bend amount for at least one of the first or the second finger segment, wherein the calculation of the bend amount is based at least in part upon evaluating one or more contrasts in brightness between the one or more identified joint lines and one or more adjacent finger segments;
   determining a position of a fingertip of the pointing finger based at least in part upon the calculated slant amount and the calculated bend amount for the at least one of the first or the second finger segment; and
   causing a cursor rendered on a display screen of the computing device to move correspondingly on the display screen based at least in part on the position of the fingertip of the pointing finger.

2. The computer-implemented method of claim 1, wherein the capturing of the image uses an infrared camera on the computing device.

3. The computer-implemented method of claim 1, wherein the determining of the position of the fingertip occurs when the fingertip is in a dead zone, the dead zone being an area not viewable by the camera of the computing device.

4. The computer-implemented method of claim 1, wherein the determining of the portion of the pointing finger in the captured image utilizes image processing based on at least one of convexity defects, skeletonization, or template matching.

5. A computer-implemented method comprising:
   capturing, using a camera of a computing device, an image representing at least a portion of a pointing finger of a hand of a user of the computing device;

obtaining historical characteristic data for the hand of the user while the hand of the user is in a field of view of the camera, the at least a portion of the pointing finger in the captured image being determined based at least in part on the historical characteristic data, the historical characteristic data including (i) historical characteristic device data relating to physical dimensions of the computing device, and (ii) historical characteristic user data relating to physical dimensions of a pointing finger of the hand of the user;

determining an orientation of the portion of the pointing finger;

detecting one or more linear features in the portion of the pointing finger that are less than a threshold amount of deviation from being orthogonal to the determined orientation of the portion of the pointing finger;

identifying one or more joint lines in the portion of the pointing finger based at least in part upon the one or more detected linear features; and determining a position of a fingertip of the pointing finger based at least in part upon data regarding a slant amount and a bend amount for at least one of a first finger segment or a second finger segment of the pointing finger, the data being obtained based at least in part upon information relating to the one or more identified joint lines and the historical characteristic data.

6. The computer-implemented method of claim 5, wherein the capturing of the image uses at least one infrared camera on the computing device.

7. The computer-implemented method of claim 5, wherein the determining of the position of the fingertip occurs when the fingertip is in a dead zone, the dead zone being an area not viewable by the camera of the computing device.

8. The computer-implemented method of claim 5, wherein data for at least one of the pointing finger, the fingertip of the pointing finger, the one or more joint lines, the first finger segment, the second finger segment, the hand, or the computing device are obtained using at least one of a user-input survey process, a calibration process, historical data relating to the hand, or currently learned data relating to the hand.

9. The computer-implemented method of claim 8 wherein the data is obtained using at least one of a stereo camera or a three dimensional camera.

10. The computer-implemented method of claim 8, wherein the determining of the position of the fingertip utilizes at least in part the data for at least one of the pointing finger, the fingertip of the pointing finger, the one or more joint lines, the first finger segment, the second finger segment, the hand, or the computing device.

11. The computer-implemented method of claim 5, wherein the data regarding the slant amount is obtained based at least in part upon information relating to the identified joint lines by evaluating a brightness contrast between at least two palmar side areas on the portion of the pointing finger.

12. The computer-implemented method of claim 5, wherein the one or more identified joint lines are at least two joint lines and wherein the data regarding the slant amount is obtained, based at least in part upon information relating to the at least two joint lines, by evaluating a measurement of distance between midpoints of the at least two joint lines.

13. The computer-implemented method of claim 5, wherein the data regarding the bend amount is obtained based at least in part upon information relating to the identified joint lines by evaluating one or more contrasts in brightness between the one or more identified joint lines and one or more adjacent finger segments.

14. The computer-implemented method of claim 5, wherein the orientation of the portion of the pointing finger is determined based at least in part upon historical information about the position of the fingertip of the pointing finger in a previously captured image frame.

15. The computer-implemented method of claim 5, wherein the detecting of the one or more linear features is based at least in part upon detecting one or more dark regions on a palmar side of the pointing finger.

16. A computing device comprising:
at least one camera;
a processor; and
a memory device including instructions that, when executed by the processor, cause the computing device to:
capture, using the at least one camera, an image representing at least a portion of a pointing finger of a hand of a user of the computing device;
obtain historical characteristic data for the hand of the user while the hand of the user is in a field of view of the camera, the at least a portion of the pointing finger in the captured image being determined based at least in part on the historical characteristic data, the historical characteristic data including (i) historical characteristic device data relating to physical dimensions of the computing device, and (ii) historical characteristic user data relating to physical dimensions of a pointing finger of the hand of the user;
determine an orientation of the portion of the pointing finger;
detect one or more linear features in the portion of the pointing finger that are less than a threshold amount of deviation from being orthogonal to the determined orientation of the portion of the pointing finger;
identify one or more joint lines in the portion of the pointing finger based at least in part upon the one or more detected linear features; and
determine a position of a fingertip of the pointing finger based at least in part upon data regarding a slant amount and a bend amount for at least one of a first finger segment or a second finger segment of the pointing finger, the data being obtained based at least in part upon information relating to the one or more identified joint lines and the historical characteristic data.

17. The computing device of claim 16, wherein the at least one camera is at least one infrared camera.

18. The computing device of claim 16, wherein the determining of the position of the fingertip occurs when the fingertip is in a dead zone, the dead zone being an area not viewable by the at least one camera of the computing device.

19. The computing device of claim 16, wherein data for at least one of the pointing finger, the fingertip of the pointing finger, the one or more joint lines, the first finger segment, the second finger segment, the hand, or the computing device are obtained using at least one of a user-input survey process, a calibration process, historical data relating to the hand, or currently learned data relating to the hand.

20. The computing device of claim 19, further comprising:
a touchscreen configured to aid in the obtaining of the data using the calibration process, wherein the touchscreen is used in calibrating a distance between the fingertip and a face of the computing device to be zero-valued when the touchscreen senses a touch of the fingertip on the touchscreen.

21. The computing device of claim 19, wherein the determining of the position of the fingertip utilizes at least in part the data for at least one of the pointing finger, the fingertip of the pointing finger, the one or more joint lines, the first finger segment, the second finger segment, the hand, or the computing device.

22. A non-transitory computer-readable storage medium including instructions for identifying elements, the instructions when executed by a processor of a computing device causing the computing device to:

capture, using a camera of the computing device, an image representing at least a portion of a pointing finger of a hand of a user of the computing device;

obtain historical characteristic data for the hand of the user while the hand of the user is in a field of view of the camera, the at least a portion of the pointing finger in the captured image being determined based at least in part on the historical characteristic data, the historical characteristic data including (i) historical characteristic device data relating to physical dimensions of the computing device, and (ii) historical characteristic user data relating to physical dimensions of the pointing finger of the hand of the user;

determine an orientation of the portion of the pointing finger;

detect one or more linear features in the portion of the pointing finger that are less than a threshold amount of deviation from being orthogonal to the determined orientation of the portion of the pointing finger;

identify one or more joint lines in the portion of the pointing finger based at least in part upon the one or more detected linear features; and determine a position of a fingertip of the pointing finger based at least in part upon data regarding a slant amount and a bend amount for at least one of a first finger segment or a second finger segment of the pointing finger, the data being obtained based at least in part upon information relating to the one or more identified joint lines and the historical characteristic data.

23. The non-transitory computer-readable storage medium of claim 22, wherein the data regarding the slant amount is obtained based at least in part upon information relating to the identified joint lines by evaluating a brightness contrast between at least two palmar side areas on the portion of the pointing finger.

24. The non-transitory computer-readable storage medium of claim 22, wherein the one or more identified joint lines are at least two joint lines and wherein the data regarding the slant amount is obtained, based at least in part upon information relating to the at least two joint lines, by evaluating a measurement of distance between midpoints of the at least two joint lines.

25. The non-transitory computer-readable storage medium of claim 22, wherein the data regarding the bend amount is obtained based at least in part upon information relating to the identified joint lines by evaluating one or more contrasts in brightness between the one or more identified joint lines and one or more adjacent finger segments.

* * * * *